Feb. 22, 1949.　　　　A. C. O'NEAL　　　　2,462,667
EVER-READY RIGID TOP FOR CONVERTIBLE
AUTOMOTIVE VEHICLES
Filed Aug. 19, 1946

Inventor
Alfred C. O'Neal
By Philip A. Friedell
Attorney

Patented Feb. 22, 1949

2,462,667

UNITED STATES PATENT OFFICE 2,462,667

EVER-READY RIGID TOP FOR CONVERTIBLE AUTOMOTIVE VEHICLES

Alfred C. O'Neal, Andalusia, Ala.

Application August 19, 1946, Serial No. 691,511

1 Claim. (Cl. 296—107)

This invention relates to improvements in overhead covers or tops for convertible automotive vehicles and provides a new and readily accessible top for the passenger compartment and which is formed of a rigid material, such as molded plastic, sheet metal, or the like, and one which can be removed from, or brought into covering position at will, and because of its rigid nature will provide a protective covering from falling rocks or overturning of the vehicle.

The conventional convertible automobile is provided with a cover which is formed of a flexible material such as fabric coated with a water repellant or resistant material or from tightly woven canvas, and is supported by bows, the entire top folding back of the seat, sometimes within a compartment. Such type of top provides virtually no protection against objects which may fall on the top, or against overturning of the vehicle. Thus my invention offers many advantages over the conventional type of top.

My invention being formed of a rigid material cannot be folded but instead is made movable to two positions respectively, over the passenger compartment, and over the luggage compartment at the back of the vehicle and is made of a form conforming to the top surface of the luggage compartment or back portion of the automobile. It locks in either position and can easily be brought to either of its positions by one of the occupants of the vehicle.

The objects and advantages of the invention are as follows:

First, to provide a rigid removable top for convertible types of automotive vehicles.

Second, to provide a top of rigid construction which can be brought into occupant protective position quickly and easily, and just as easily be moved to a non-obstructive position when overhead protection is not desired or needed.

Third, to provide a top as outlined which has one support directly back of the seat of the vehicle with the other supports being respectively and selectively, on the windshield of the vehicle and on the stern end of the vehicle.

Fourth, to provide a top as outlined which is made to conform to the top surface of the rear portion of the vehicle.

Fifth, to provide a top as outlined with securing means for selective securing in its protective and non-protective positions.

Sixth, to provide a top as outlined which is simple in construction and operation and economical to manufacture.

In describing the invention reference will be had to the accompanying drawings, in which.

The invention consists of a top 10 formed of rigid material such as metal or plastic or other suitable material of great strength and resistance to flexure, and in which the top has anchoring means back of the passenger compartment as indicated at 11 or 12 with the anchoring means arranged to permit the top to be moved at will from positions, over the passenger compartment as indicated in full lines, or over the luggage compartment as indicated by dotted lines, and includes means for securing the top in either of its positions but releasable under urgence from its rearward position.

Figure 2:
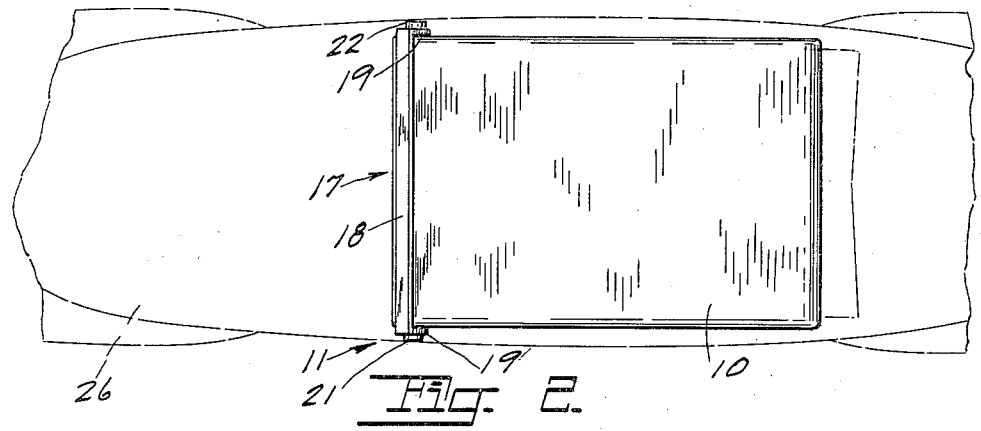
Fig. 2 is a top plan view of Fig. 1.
Figure 1:
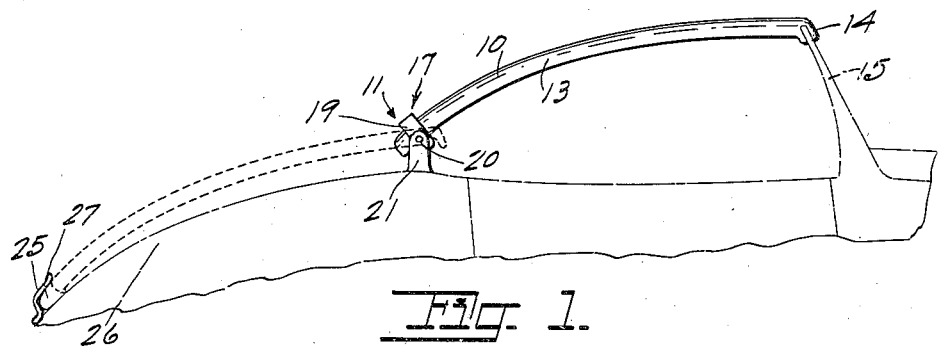
Fig. 1 is a fragmentary side elevation of a convertible type automotive vehicle showing the invention installed thereon.
Figure 3:
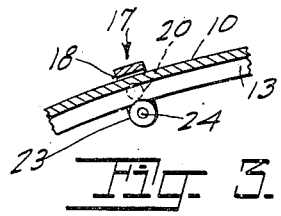
Fig. 3 is a fragmentary view showing the top guide and holder and a portion of the top in section.
Figure 4:
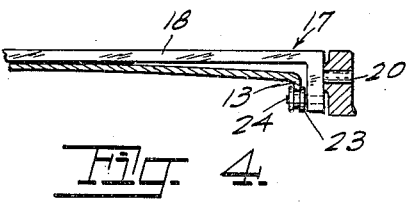
Fig. 4 is a fragmentary rear elevation of the top guide and holder.
Figure 5:
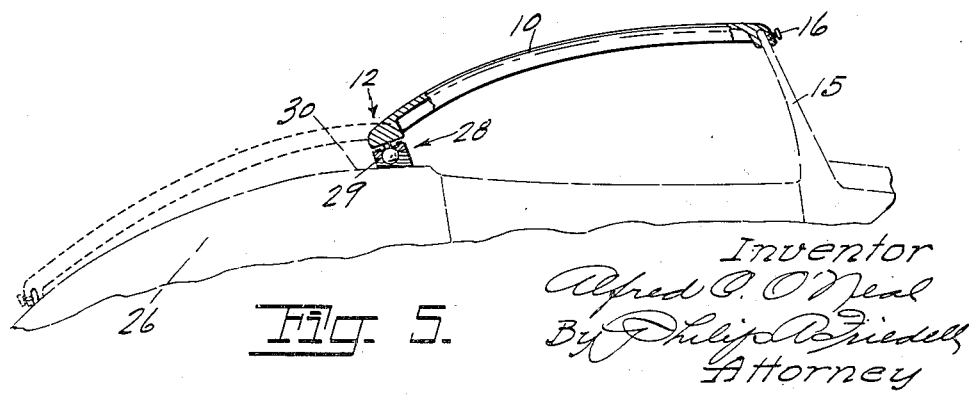
Fig. 5 is a side elevation of a modification of the invention.

As illustrated in Figs. 1 to 4, the top 10 is reinforced by side ribs or skirts 13 and has means 14 at the forward end to grip over the top member of the frame 15 of the windshield, and which gripping means may include securing means such as a clamp screw 16 Fig. 5.

The rearward end of the top is supported in a cradle 17 which has a cross-member 18 to span the top and prevent its lifting under wind pressure, and has a depending leg 19 at each end each of which carries a pivot 20 by which the member is pivotally supported in the bearings 21 and 22, the size of these bearings being purposely exaggerated in the drawings for purposes of clarity.

A grooved roller 23 is pivotally mounted on the inside of each leg near the lower end as indicated at 24 and the flanges 13 ride in these rollers, making conversion simple and easy.

With this type of top, it is only necessary to lift the front end off the windshield top crossmember after releasing any securing means and slide the top back to the position indicated by the dotted lines, and until the rear end has engaged under the leaf spring 25 which holds the rear end down on the top of the luggage compartment 26. When the bearings 21 and 22 are made to their minimum possible height, the top will lie practically flat on the top of the luggage compartment.

The spring clasp 25 is mounted to provide clear space 27 when the back is closed, so that the back can be raised without hindrance from the top which will merely move back as the top is raised, while the forward end pivots about the pivots 20. Thus the top is instantly available, can be moved to either position by one occupant quickly, and offers no resistance to the opening of the luggage compartment. The rollers 23 make the adjustments almost effortless.

The modification shown in Fig. 5 has one particular advantage; it can be made to conform in all particulars to the shape of the luggage compartment which it covers when in non-protective position, and consists of the same general structure except that instead of the support through which the top slides the one end of this top is supported by a ball-and-socket joint 28 which permits the top to be raised at its free end and swung around to either of its positions. It does, however, require the operator to get out of the car and support the top as he swings it around to the other position. As is readily apparent, the socket portion 29 can be concealed below the top surface 30 of the luggage compartment, and in the form shown can be mounted on the top of the luggage compartment with existent cars.

I claim:

An ever ready rigid top for a convertible automotive vehicle having a windshield, a passenger compartment and a rear compartment, comprising; an arcuately formed top uniform in cross-section throughout its length and including means for releasably securing the forward end to the top of the windshield, a bracket spanning said top, and a bearing mounted on each side of said rear compartment and pivotally supporting the respective ends of said bracket, said bracket having a depending leg at each end and a roller mounted on the inside of each leg, with said top retained within said bracket and supported and movable in either direction on said rollers, and holding means located on the rearward end of said rear compartment for securing the rearward end of said top when moved to its most rearward position, and with said bracket securing the rearward end when the top is in its most forward position, whereby said top is slidable through said bracket and retained therein in any position and hinged at its forward end to permit unrestricted opening of the rear compartment when the top is in its most rearward position over the compartment, and movable over the passenger compartment at will to be secured to the top of the windshield.

ALFRED C. O'NEAL.

REFERENCES CITED

The following references are of record in the file of this patent:

UNITED STATES PATENTS

| Number | Name | Date |
|---|---|---|
| 109,966 | Stocking et al. | Dec. 6, 1870 |
| 319,229 | Gordon | June 2, 1885 |
| 1,271,745 | Muller | July 9, 1918 |
| 1,722,227 | Lukesh | July 23, 1929 |
| 2,051,140 | Grimston | Aug. 18, 1936 |
| 2,118,520 | Pendleton | May 24, 1938 |

FOREIGN PATENTS

| Number | Country | Date |
|---|---|---|
| 4,056 | Great Britain | 1907 |